United States Patent
Kilkenny et al.

(12)

(10) Patent No.: US 6,350,381 B2
(45) Date of Patent: *Feb. 26, 2002

(54) BIODEGRADATION OF ETHERS USING FATTY ACID ENHANCED MICROBES

(75) Inventors: Scott Tracey Kilkenny, Culver City; William Thornton Stringfellow, Berkeley, both of CA (US)

(73) Assignee: Kinder Morgan Energy Partners, L.P., Orange, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,663

(22) Filed: Oct. 27, 1998

(51) Int. Cl.$^7$ ................................................. C02F 3/00
(52) U.S. Cl. ........................ 210/610; 210/611; 210/617; 210/908
(58) Field of Search ................................. 210/610, 611, 210/617, 908

(56) References Cited

U.S. PATENT DOCUMENTS

| 3,883,397 A | | 5/1975 | Townsley |
| 4,664,805 A | | 5/1987 | Focht |
| 4,713,343 A | | 12/1987 | Wilson, Jr. et al. |
| 4,766,112 A | * | 8/1988 | Geogelman |
| 4,925,802 A | | 5/1990 | Nelson et al. |
| 5,083,610 A | * | 1/1992 | Sheehy ................. 210/610 |
| 5,443,845 A | | 8/1995 | Felix |
| 5,487,834 A | * | 1/1996 | Carman ................. 210/611 |
| 5,510,112 A | * | 4/1996 | Gatt |
| 5,516,688 A | * | 5/1996 | Rothmel ................. 210/611 |
| 5,552,052 A | | 9/1996 | Mazewski et al. |
| 5,567,324 A | * | 10/1996 | Rothmel ................. 210/611 |
| 5,624,843 A | | 4/1997 | Varadaraj et al. |
| 5,667,673 A | | 9/1997 | Hogen et al. |
| 5,725,885 A | | 3/1998 | Felix et al. |
| 5,811,010 A | | 9/1998 | Salanitro |
| 5,814,514 A | | 9/1998 | Steffan et al. |
| 5,831,122 A | * | 11/1998 | Eyal |
| 6,096,348 A | * | 8/2000 | Miner |
| 6,211,240 B1 | * | 4/2001 | Zurfluh |

FOREIGN PATENT DOCUMENTS

| JP | 1-171478 | * | 7/1989 |
| JP | 6-47391 | * | 2/1994 |

OTHER PUBLICATIONS

Pine et al., Organic Chemistry, 4th edn., McGraw–Hill, 1980, pp 197–203.*

* cited by examiner

Primary Examiner—Chester T. Barry
(74) Attorney, Agent, or Firm—Bracewell & Patterson, L.L.P.

(57) ABSTRACT

Microorganism growth in aqueous systems used for degradation of ether-based compounds such as MTBE is stimulated and maximized by utilizing fatty acids as the growth substrate for the microorganisms. The fatty acid functions as an inexpensive growth substrate that can be introduced into the aqueous system to quickly maximize the growth of the active microbe incorporated therein. Such a characteristic is desirable since fatty acids are non-toxic, water soluble, typically inexpensive and readily available. In one preferred embodiment, the fatty acid is food grade lactate.

16 Claims, 1 Drawing Sheet

BIODEGRADATION OF ETHERS USING FATTY ACID ENHANCED MICROBES

FIELD OF THE INVENTION

This invention relates to the aerobic biodegradation of alkyl ethers by employing biological organisms in which microbial growth of the organisms has been enhanced by fatty acids. More particularly, this invention relates to the biodegradation of ether-based compounds, such as methyl-tertiary-butyl ether (MTBE), in aqueous systems by treatment of the aqueous systems with microorganisms the growth of which has been stimulated by the presence of a fatty acid such as lactate.

BACKGROUND OF THE INVENTION

Methyl-tertiary-butyl ether (MTBE) is a fuel oxygenate that is added to gasoline to enhance octane levels, increase burning efficiency and reduce the emission of atmospheric pollutants. Oxygenated compounds such as this have become common in recent years as air quality standards have become more stringent. MTBE is especially popular due to its low production cost, high octane rating, evaporative qualities and solubility with other gasoline components. In general, ether-based compounds such as MTBE, especially those compounds which have only one ether linkage and without other functional groups, are chemically stable and thus not easily degradable. These compounds are also soluble in water and absorb poorly to soil. One characteristic of MTBE, for example, is that it rapidly migrates to ground water through soil. Thus, due to its increased usage and chemical characteristics, MTBE is showing up in greater quantities in drinking water, groundwater, surface waters, and waste water. Although the effects of MTBE on humans are still under study, in the very least, when present in large enough quantities, MTBE in drinking water can result in unpleasant taste and odor. Therefore, as the use of MTBE continues to increase, there is a heightened need to develop processes that can effectively, but cost efficiently, reduce levels of MTBE on a large enough scale to be used in water purification.

The four most common methods for removing MTBE from water are air stripping, absorption, advanced oxidation and hydrophobic membrane separation. Each has inherent drawbacks. For example, since MTBE is a highly water soluble polar compound, high air to water ratios are required in the air stripping process, and, consequently, the use of air stripping may not be economical, especially on large scales as is necessary for water purification. Likewise, membrane separation is considered too expensive for use in general water treatment applications. Notwithstanding these economic drawbacks, there are environmental drawbacks as well. Although air stripping and absorption to particles such as granular activated carbon (GAC) result in remediation of the target contaminant, these methods suffer from the fact that they simply transfer the contaminant to another medium, either to the atmosphere (air stripping) or to solid medium (absorption) which must then be disposed of as hazardous waste. In other instances, such as in some advanced oxidation processes that utilize ozone and ozone/peroxide, the processes result in undesirable by-products such as bromate.

The drawbacks associated with the most common methods of hydrocarbon removal from water have led to the investigation of other purification processes. Biological degradation (biodegradation) is widely used for the treatment of many pollutants. If the target compound is biodegradable, biological treatment is recognized as being the most cost effective treatment method. For this reason many recent processes for removing MTBE and similar ether-based compounds from water have focused on biodegradation techniques. As mentioned above, alkyl ethers such as MTBE are not easily biodegraded. However, it is known that other compounds exhibiting similar biodegradation characteristics to alkyl ethers, such as trichloroethylene (TCE) which is a chlorinated solvent, can be degraded through a process known as "cometabolic degradation" or biodegradation. Cometabolic degradation, also referred to as "cometabolism", is a process in which enzymes that serve a primary metabolic function in a microorganism can be used to break down a target compound that otherwise would not be biodegradable. In such cometabolic processes, the target compound undergoes metabolic transformation while a second compound serves as a primary energy or carbon source.

Often, the success or effectiveness of biodegradation is dependent upon key factors being simultaneously present. First, microorganisms must be present, either naturally or by addition. Second, there must be oxygen, water and trace minerals present available to permit the microorganisms to be metabolically active. Third, there must be available sufficient quantities of biologically utilizable nutrients or "food" to enable the microbial population to grow and survive. In the industry, these nutrients are known as the "growth substrate" or "energy source". In many cases, the growth substrate or energy source is the target compound itself. In other cases, the target compound will not support bacterial growth by itself and an additional growth substrate must be added to allow the degrading microorganism to grow and cometabolize the target compound. Alkyl ethers, in particular MTBE, have been utilized in both instances. Specifically, in some instances MTBE is merely the target of a biodegradation process, while in other instances, not only is MTBE the target of a biodegradation process, but MTBE is also the growth substrate utilized in the biodegradation process.

U.S. Pat. No. 5,750,364, illustrates use of alkyl ethers directly as growth substrates. This patent teaches a bacterial culture prepared from an ether containing a t-butyl moiety, such as MTBE, and an activated sludge. Specifically, a solution is formed by combining a mineral nutrient solution with biosludge recovered from a waste water treatment plant. The resulting solution is then subjected to an enrichment process that typically lasts from about one month to about one year during which the resulting solution is flushed with $O_2$; combined with a branched alkyl ether; stirred mechanically; skimmed to remove a portion of the supernatant; and replenished with additional mineral solution and ether. The patent teaches that following this enrichment process, the culture becomes active in consistently degrading MTBE concentrations in the supernatant. One drawback to the prior art method of growing microorganism directly on alkyl ethers is that the growth of the microorganism is sporadic and processes dependent on the growth of microorganisms directly on the alkyl ether are inherently unreliable. Often, the result is identification of microbes that can be grown and are effective on a laboratory scale in small quantities, but are not easily reproduced in large enough quantities to be viable for large scale water purification operations, such as is used by municipalities. Further, although the microorganisms might be effective in degrading the target compound, the microorganisms do not grow prolifically in the presence of the target compound. Thus, growth and maintenance of such microorganisms, when possible, is typically time consuming and expensive. For example, in U.S. Pat. No. 5,750,364, referenced above, the process for growing an initial colony of microorganisms requires a minimum of four months.

The prior art has focused on the cometabolism of poorly degraded compound such as chlorinated solvents and alkyl ethers. For example, U.S. Pat. No. 4,713,343 discloses a method and apparatus for treating ground water contaminated with halogenated aliphatic hydrocarbon compounds. In the process, bacteria that can aerobically degrade low molecular weight chlorinated solvents utilizing monooxygenase are combined with the chlorinated solvents in the presence of a low molecular weight alkaynes and oxygen.

In another example, U.S. Pat. 5,814,514 teaches the use of propane-oxidizing bacteria that produce propane monooxygenase (PMO). Specifically, the patent teaches that since PMO is the enzyme primarily responsible for degradation of ether-based compounds, those bacteria that produce PMO are the most effective in degrading ether-based compounds. Although the patent also teaches various carbon sources that are effective in growing the microorganisms, such as propane, isopropanol, acetone, ethanol, butane, laruia broth, trypticase soy agar, and nutrient broths, including casamino acids and/or yeast extract, the primary focus of the teachings is on identification of PMO producing bacteria.

U.S. Pat. No. 4,925,802, teaches the use of innocuous, nontoxic, nongaseous growth substrate that stimulates microorganisms to degrade halogenated aliphatic hydrocarbons by including oxygenase-controlled pathways. Examples of such growth substrate include aromatic amino acids, such as tiyptophan and C10–C20 linear alkanes. The target hydrocarbons are volatile chlorinated aliphatic (VCA) hydrocarbons such as chlorinated ethylene or trichloroethylene. Drawbacks to this patent include the high cost of the growth substrate and the poor water solubility of the co-metabolic compounds.

In those limited instances where various growth substrates have been exploited in biodegradation processes, the processes have yielded unsatisfactory results. In U.S. Pat. No. 4,664,805, the invention is a process that combines an indigenous bacteria with a non-indigenous microorganism and a non-toxic analog or growth substrate. The non-toxic growth substrate is provided to be metabolized by both types of microorganisms and to support growth of both microorganisms. The patent teaches that the specific nature of the growth substrate is a halogenated organic compound containing few or no halogen atoms, such as biphenyl. In the process, an indigenous microorganism capable of decontaminating environments containing halogenated organic compounds is combined with a non-indigenous microorganism that produces metabolic products that support growth of the indigenous microorganism. The growth substrate is present to stimulate growth of both microorganisms. Notwithstanding the complicated nature of the process, one drawback to the process is the need for multiple microorganisms. Additionally, there is some question regarding the toxicity of the growth substrate taught therein.

In none of the prior art of which Applicants are aware are there successful procedures for degradation of certain alkyl ethers such as MTBE in which a substrate is provided to stimulate enzyme production and maximize microbial growth without interfering with the degradation process, especially in the presence of a substrate that is non-toxic. Heretofore, the prior art has not taught a biodegradation process in which the microorganism utilized therein do not rely on the alkyl ether to grow and in which the co-metabolic substrates are very water soluble, inexpensive and ingestible by humans.

SUMMARY OF THE INVENTION

It is accordingly one object of the invention to provide a method for the degradation of certain alkyl ethers under aerobic conditions so as to degrade and effectively remove these alkyl ethers from water.

A further object of the invention is to provide a method for the purification of water including purification of ground water and drinking water.

A further object of the invention is to provide a method for the aerobic degradation of MTBE which are present in aqueous systems by the use of microorganisms which have the capacity to metabolize the MTBE.

A further object of this invention is to provide a method for utilizing lactate in conjunction with metals such as iron and manganese to stimulate MTBE biodegradation by iron and manganese oxidizing microorganisms.

A further object of the invention is to provide a method for the purification of water in situ.

A further object of the invention is to provide a growth substrate for the above processes that is non-toxic and water soluble.

A further object of the invention is to provide a growth substrate that can be used to manufacture MTBE degrading microorganisms and to isolate MTBE degrading enzymes produced therefrom.

The subject invention provides a process for the biodegradation of ethers using fatty acid enhanced microbes. When combined with certain microorganisms, such fatty acids permit the control of the MTBE biodegradation process to a fuller extent and a faster rate than achieved in the prior art. In one embodiment, microorganism growth is stimulated and maximized by utilizing lactate as the primary carbon source for the microbes. The fatty acid functions as an inexpensive growth substrate that can be introduced into an aqueous system to quickly maximize the size of the active microbe colony present therein. In a preferred embodiment, the lactate used in the inventive process is food grade. Such a characteristic is desirable since food grade compounds are non-toxic, may be safely consumed by humans, and typically are inexpensive and readily available.

The aqueous systems with which the invention is concerned include drinking water as well as ground water, industrial waste waters and waters such as those produced by an interdiction well designed to intercept and remove a plume of contaminated ground water. The invention is particularly applicable to the treatment of ground water either in situ or by removal of a portion of the water, subjecting it to treatment and then returning the water to its environment. Broadly, however, the invention is concerned with the treatment of water, regardless of location or source, to remove the indicated contaminant using microorganisms stimulated by a substrate that is water soluble, nontoxic and innocuous to the aqueous system.

DETAILED DESCRIPTION OF THE INVENTION

Figure 1:
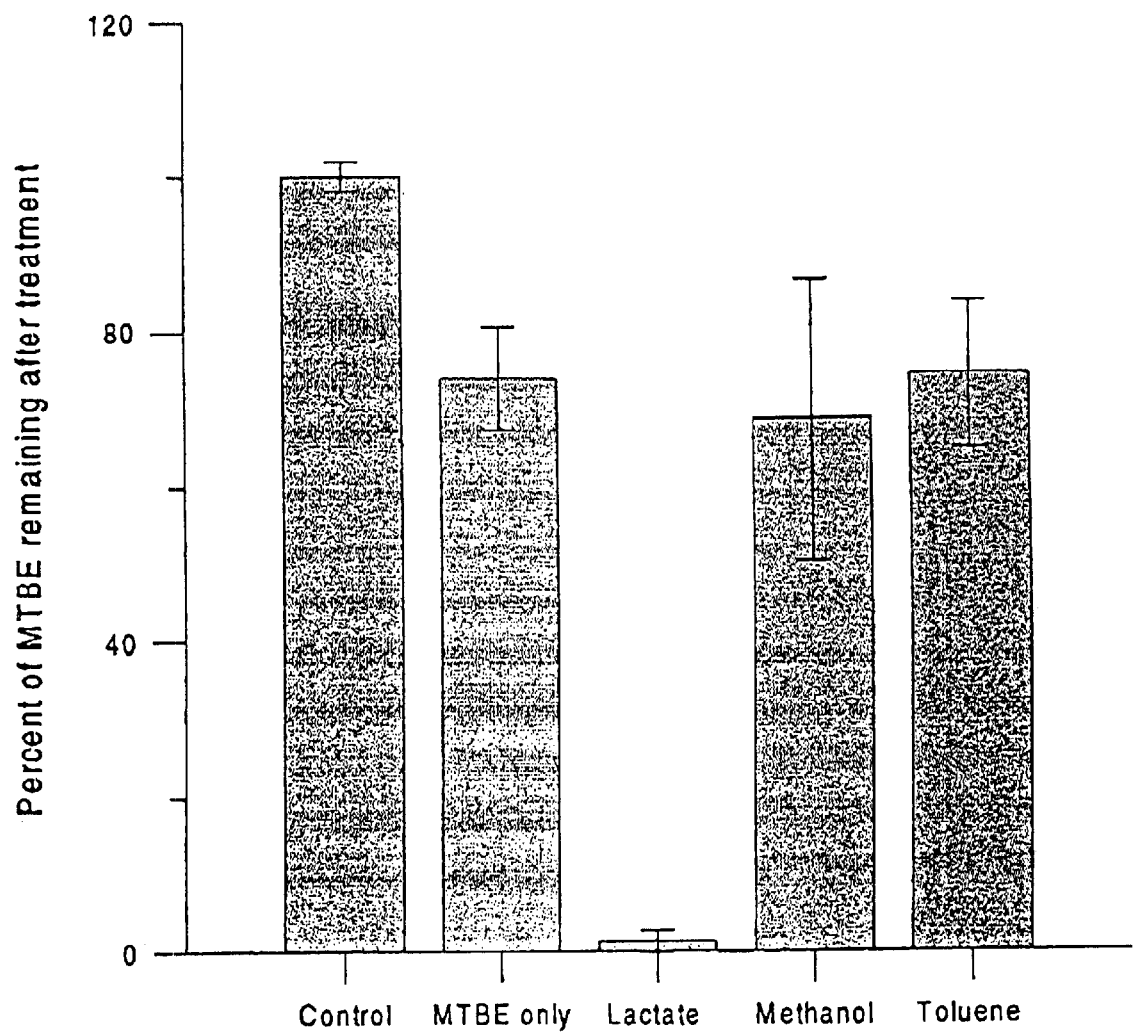
FIG. 1 illustrates the effectiveness in MTBE biodegradation of use of fatty acid as a growth substrate in the present invention as compared to other prior art growth substrates.

While applicable to the treatment of any ether-based compound which is degradable by microorganisms, the present process is most readily adapted for the degradation of MTBE in water treatment processes. Particularly, the invention involves a novel growth substrate that is capable of producing rapid growth of bacteria in an aqueous system, facilitating the degradation of MTBE to innocuous products such as water and $CO_2$. As used herein, the term "water" includes organic and inorganic liquids or mixtures thereof containing biologically decomposable compounds. The novel growth substrate can also be used to metabolize other ether-based compounds. Non-limiting and illustrative examples of such compounds include diethyl ether (DDE), dimethyl ether (DME), methyl ethyl ether (MME), methyl n-propyl ether (MPE), ethyl n-propyl ether, methyl isopropyl ether, ethyl isopropyl ether, diisopropyl ether (DIPE), ethyl t-butyl ether (ETBE) or methyl-t-amyl ether.

As a more specific embodiment of the present invention, the novel growth substrate includes any growth substrate comprising fatty acids. Fatty acid was identified as a potential growth substrate by investigating the by-products of active bacteria. It was observed that as an organism such as bacteria metabolizes a compound, the by-products of metabolic process includes compounds, such as amino acids and fatty acids, that can also function as a food source for other bacteria during a co-metabolic process. Thus, on the premise that fatty acids could be utilized as a growth substrate in bio-reactors, investigation of various microorganisms that are most responsive to fatty acids was carried out. Specifically, those microorganisms that are most stimulated by fatty acids were investigated as potential microbes for the biodegradation process of the current invention. Although the microbes used in the most preferred embodiment are bacteria, those skilled in the art will understand that other biodegradative microorganisms are included within the scope of the invention, such as for example, fungus. The bacteria that have been found most responsive to fatty acid growth substrates are Nocardioform bacteria, including but not limited to *Nocardia luteits* and *Rhodococcus erythropolis*, and iron oxidizing and manganese oxidizing bacteria. In addition, the fatty acid of the present invention is likely to stimulate certain proprietary bacteria such as *Mycobacterium vaccae* taught in U.S. Pat. No. 5,814,514.

Although those skilled in the art will understand that the invention encompasses all fatty acids, in one preferred embodiment, the fatty acid utilized in the process is lactate. Lactate is desirable not only because it stimulates rapid microbial growth, but also because it is non-toxic and acceptable for human consumption. Specifically, lactate is a common additive in the food industry used to adjust pH. Clearly, in treating compounds intended for human consumption such as drinking water, use of food grade materials is highly desirable. Thus, use of lactate as the growth substrate in the degradation process for purification of drinking water is far more desirable than use of the prior art substrates such as toxic alcohols. Lactate is also a superior growth substrate because it is highly water soluble in comparison to other non-toxic co-metabolites such as tryptophan, gaseous alkanes, and C10–C20 alkanes. Notwithstanding the fact that lactate is fit for human consumption, its widespread and common use in food industry makes it inexpensive, easily obtainable and readily available in quantities large enough for use as contemplated herein.

FIG. 1 illustrates the effectiveness of use of fatty acid as a growth substrate in the present invention as compared to other prior art growth substrates. Specifically, batch tests utilizing mixed culture on granulated activated carbon were compared wherein various growth substrates were incorporated as cometabolites for enhancing the removal of MTBE.

As is shown the, addition of lactate stimulated the degradation of MTBE to a much greater degree than did the presence of methanol, toluene or MTBE itself as a growth substrate.

Although lactate is the most preferred fatty acid used herein, those skilled in the art will understand that other fatty acids may be utilized in accordance with the teachings of the invention, including but not limited to formate, acetate, propionate, butyrate, pyruvate, oxaloacetate, citrate, and maltate, and more broadly, branched, saturated, unsaturated or hydroxylated fatty acids. It is also understood that the lactate described herein encompasses all forms thereof, including but not limited to salt and acid forms of lactate. Of course, the most preferred fatty acids are those that are commercially available, comparatively inexpensive and easily obtainable.

A variety of bio-reactors known to those skilled in the art may be used in the practice of the present invention. Because bacteria adhere strongly to surfaces, fixed film reactors such as fluidized bed reactors or fixed support reactors may be used in the practice of the present invention. Alternatively, suspended growth reactors, such as membrane reactors, standard continuously stirred tank reactors and activated sludge systems may also be used if desired.

It is believed that fluidized bed reactors will be particularly effective in employing the growth substrate of the current invention. In one embodiment, drinking water or waste water polluted with an ether-based compound is conducted upwardly through a bed of particles contained in a fluid bed reactor. In the industry, the particulate matter or physical structure on which microbes are grown is called "fixed film". In general, the fixed film will be seeded with bacteria determined to be effective in degradation of ether and particularly susceptible to rapid growth in the presence of lactate. Suitable carrier materials for the bacteria include natural or artificial material such as coal, volcanic cinders, glass or plastic beads or rings, sand, alumina, garnet or GAC. It has been found that those particles with porous surfaces enhance attachment of the bacteria, resulting in greater biomass and higher biodegradation efficiencies.

In one surprising result, use of porous metal filings or shavings as the carrier in the bioreactor has yielded an unexpected high rate of MTBE degradation. It is suspected that by replacing a microbe-consumable fixed film such as GAC with metal filings, the potential carbon food source is removed and the microbes are forced to feed on the fatty acids and the contaminants passing through the reactor. While the aforesaid bed carrier materials are illustrative or the preferred carriers, nonetheless other materials, whether natural or synthetic, can be employed as long as such materials are nontoxic to the bacteria.

The polluted water is conducted upward through the bed of particles at a sufficiently high flow rate to cause fluidization or suspension of the particle bed. The particles serve as carriers for growth of biological material that is provided in the bed or particles and that acts on the ether-based compounds of the liquid. As the biological material grows, the size of the fluidized bed expands, resulting in increased degradation of the target compounds present in the treatment water. In one embodiment, the reactor is charged or inoculated with bacteria by flowing bacteria-containing water through the bed. The microbes cling to the particulate matter. In another embodiment, bed particles having a thin layer of bacteria seeded thereon are introduced into the reactor, the bed particles preferably first cultured with seed bacteria that is responsive to fatty acids. Seeding may be provided externally or internally within the fluidized bed column. The growth substrate of the current invention may be used in conjunction with a number of various microorganisms without limiting the scope of the invention.

Notwithstanding the specific microorganisms described above, the present invention can be used with two types of microorganisms. Exogenous microorganisms introduced to the site of the aqueous system can be specifically selected, mutated, or genetically engineered to degrade particular alkyl ethers. Alternatively, indigenous microorganisms located in situ may be used. In any event, such microorganisms capable of biodegrading alkyl ethers can be selected from mixed cultures growing the culture in the presence of a growth substrate capable of stimulating biodegradation, under conditions that the culture is enriched for microorganisms capable of degrading the target compound. Pure cultures of the microorganisms can then be isolated by subculturing the enriched population using techniques well known to one of skill in the art.

Natural environments contain indigenous microorganisms such as bacteria, fungi, viruses and other microorganisms. Such microorganisms are generally present in mixtures of microorganisms having differing capabilities for metabolizing the undesired contaminants. A given sample of soil may contain microorganisms, some of which are capable of metabolizing the contaminant at so slow a rate that the contaminant persists over an extended period of time without any marked decrease in concentration. Other microorganisms may metabolize the contaminant at a more appreciable rate, but yet not at a rate which is effective to decontaminate the environment within a reasonable period of time. Still yet other types of microorganisms may not result in any biodegradation unless appropriately stimulated. All of these types of organisms may be potentially stimulated by the fatty acid growth substrate of the present invention. For example, in one embodiment, the microorganism was naturally occurring bacteria found in ground water. These indigenous MTBE-degrading bacteria have proven highly susceptible to stimulation by fatty acids.

In another embodiment, the microorganism is an iron-oxidizing strain of bacteria. In conjunction with the above mentioned metal carriers, it is known that a broad category of bacteria, referred to as metal bacteria, act upon certain metals such as iron, manganese and vanadium. It is believed that such bacteria, when attached to the metal carriers, may cause redox changes in the metals yielding products that effect the biodegradation process, either alone or in combination with the fatty acid substrate of the invention. Thus, another embodiment of the invention utilizes a metal bacteria coated on metal carrier material in the presence of a fatty acid substrate to stimulate degradation of alkyl ethers.

Operation of the bioreactor will usually have two phases: an initial batch operation and then a continuous operation. The batch operation is used to produce large amounts of degradative microorganisms as described above within the reactor system, and to acclimate the degradative organisms to the contaminant feed. In one preferred embodiment, for simplicity, the fatty acid and the alkyl ether are concurrently incubated with the selected microorganisms. Alternatively, the system may be initially seeded with bacteria while at the same time introducing fatty acid into the system to enhance growth of the bacteria that forms the bed of the reactor. The fatty acid may be introduced into the system by any suitable method, such as direct drip feed. During inoculation, the system may be saturated with fatty acid to permit biomass growth as fast and as large as possible, limited only by the other physical constraints of the system, such as the physical size of the particulate matter on which the microbes reside. The acclimation period for the bacteria within such a system is approximately less than one week.

Once equilibrium of the system is reached and the rate of microbe growth decreases, the excess fatty acid may be carried out of the system with the effluent. Thereafter, throughout the operation of the system, additional fatty acid may be introduced to maintain the size of the bacteria colony to ensure maximum degradation of the MTBE. Although it is known that the microbes fix the MTBE to a colony and then degrade the MTBE into common waste products, the specific mechanism for degradation, i.e., consumption, absorption, encapsulation, alteration, etc., is unknown at this time. In any event, the oxygen level of the water is monitored, along with the level of MTBE degradation, as an indicator of biomass growth and dead microbe cells. The expired microbe cells are removed with the effluent or otherwise collect at the bottom of the reactor where they are removed.

Utilizing the above described system, removal of methyl-tertiary-butyl ether (MTBE) from aqueous systems containing drinking water, wastewater, ground water, tank water, etc. can be carried out less expensively than prior art processes, and utilizing compounds that are much more suitable for ingestion by humans. The low cost and wide availability of lactate makes it an ideal growth substrate for use in large purification processes common to municipalities. Notwithstanding the desirability due to the human-consumable nature, availability and low cost of the growth substrate of the invention, the fatty acids of the invention are also preferable over the prior art since they are highly water soluble and result in rapid colonization and growth of the biomass incorporated in bio-reactors. Rapid growth of such biomass reduces process times. More significantly, as the size of the biomass grows, the amount of MTBE degradation is enhanced. By way of example, prior art processes that utilize such microbes in a fluidized reactor typically only result in water with 100 parts per billion of MTBE and require a 4–6 month acclimation period in the reactor before utilization. In contrast, the process of the current invention has yielded results as low as 35 parts per billion of MTBE and requires only a week acclimation period. Of course, those skilled in the art will understand that MTBE concentration will be effected by both the contact time and the quantity of biomass present. For example, when the process is carried out in a bioreactor, the contact time between the MTBE and the biomass can be increased by utilizing multiple reactors in series. Likewise, larger reactors may be employed to permit use of a greater amount of biomass.

While certain features and embodiments of the invention have been described in detail herein, it will be readily understood that the invention encompasses all modifications and enhancements within the scope and spirit of the following claims.

What is claimed is:

1. A process for the microbial biodegradation of ether-based compounds in an aqueous system, said process comprising the steps of
    a) contacting a microorganism capable of biodegrading the ether-based compound with a fatty acid to promote rapid growth of said microorganism; and
    b) contacting said microorganism with an ether-based compound to biodegrade said ether-based compound.

2. The process of claim 1 wherein said process is carried out in situ.

3. The process of claim 2 wherein the fatty acid and microorganism are introduced directly into the ground.

4. The process of claim 2 wherein the microorganism is indigenous to the aqueous system and said fatty acid is introduced therein.

5. The process of claim 1 wherein said process is carried out in a bio-reactor.

6. The process of claim 1 wherein the fatty acid is lactic acid.

7. The process of claim 1 wherein said fatty acid is selected from a group consisting of lactic acid, formic acid, propionic acid, butyric acid, pyruvic acid, oxaloacetic acid, citric acid, and malic acid.

8. The process of claim 1 wherein said microorganism is Nocardioform bacteria.

9. The process of claim 8 wherein said microorganism is selected from the group consisting of *Nocardia luteus* and *Rhodococcus erythropolis*.

10. The process of claim 5 wherein said bio-reactor utilizes fixed film to carry the microorganism.

11. The process of claim 10 wherein said fixed film is a metal.

12. The process of claim 1 further comprising the step of contacting said microorganism with a metal.

13. The process of claim 12 wherein said metal is selected from the group consisting of iron, manganese and vanadium.

14. The process of claim 1, wherein said ether-based compound is methyl-tertiary-butyl ether.

15. A process for the microbial biodegradation of ether-based compounds in an aqueous system, said process comprising the steps of:
   a) contacting a metal oxidizing microorganism capable of biodegrading the ether-based compound with a fatty acid to promote rapid growth of said microorganism; and
   b) contacting said microorganism with an ether-based compound to biodegrade said ether-based compound.

16. A process for the microbial biodegradation of ether-based compounds in an aqueous system, said process comprising the steps of:
   a) contacting a microorganism capable of biodegrading the ether-based compound with a fatty acid to promote rapid growth of said microorganism, wherein the microorganism is a metal oxidizing bacteria; and
   b) simultaneously contacting said microorganism with an ether-based compound biodegrade said ether-based compound.

* * * * *